Figure 1:
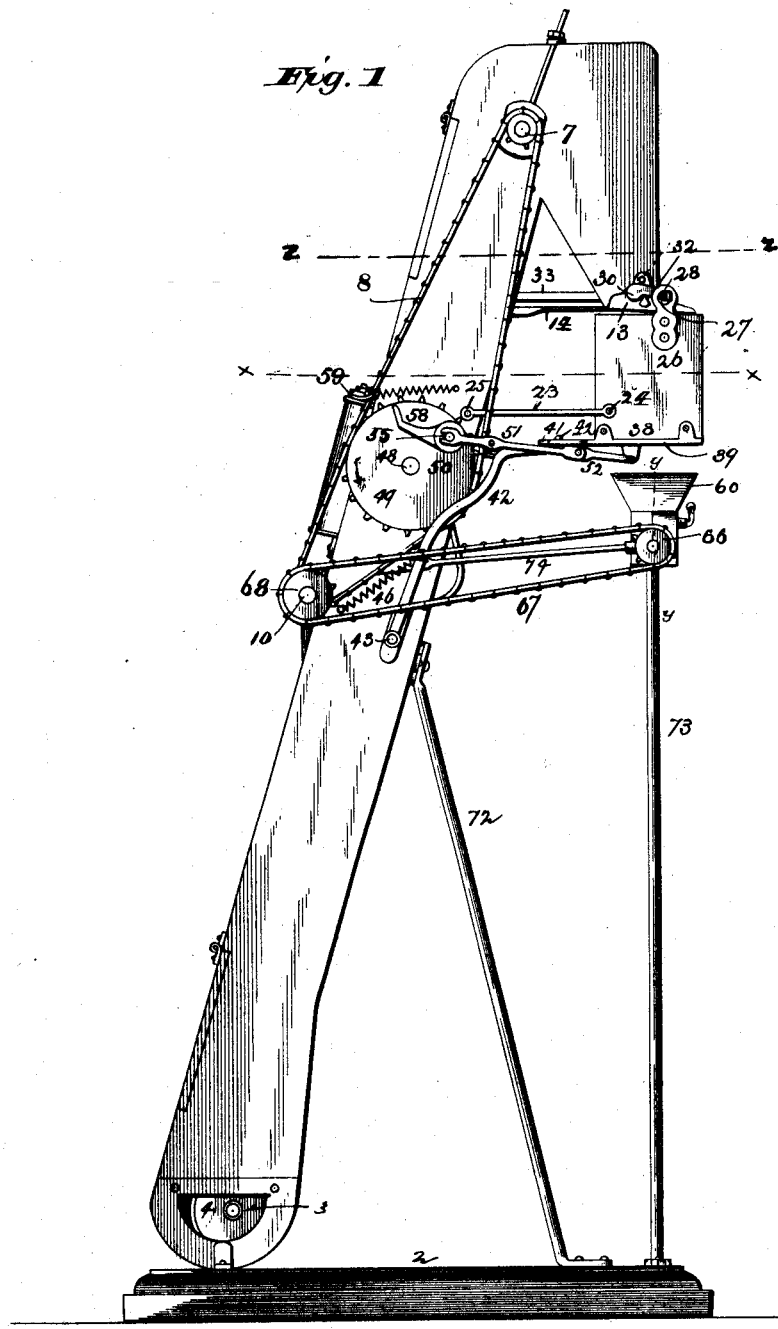

(Model.) 3 Sheets—Sheet 1.
W. LOONEY.
GRAIN MEASURING OR WEIGHING APPARATUS.

No. 431,948. Patented July 8, 1890.

WITNESSES:　　　　　　　　　　INVENTOR:

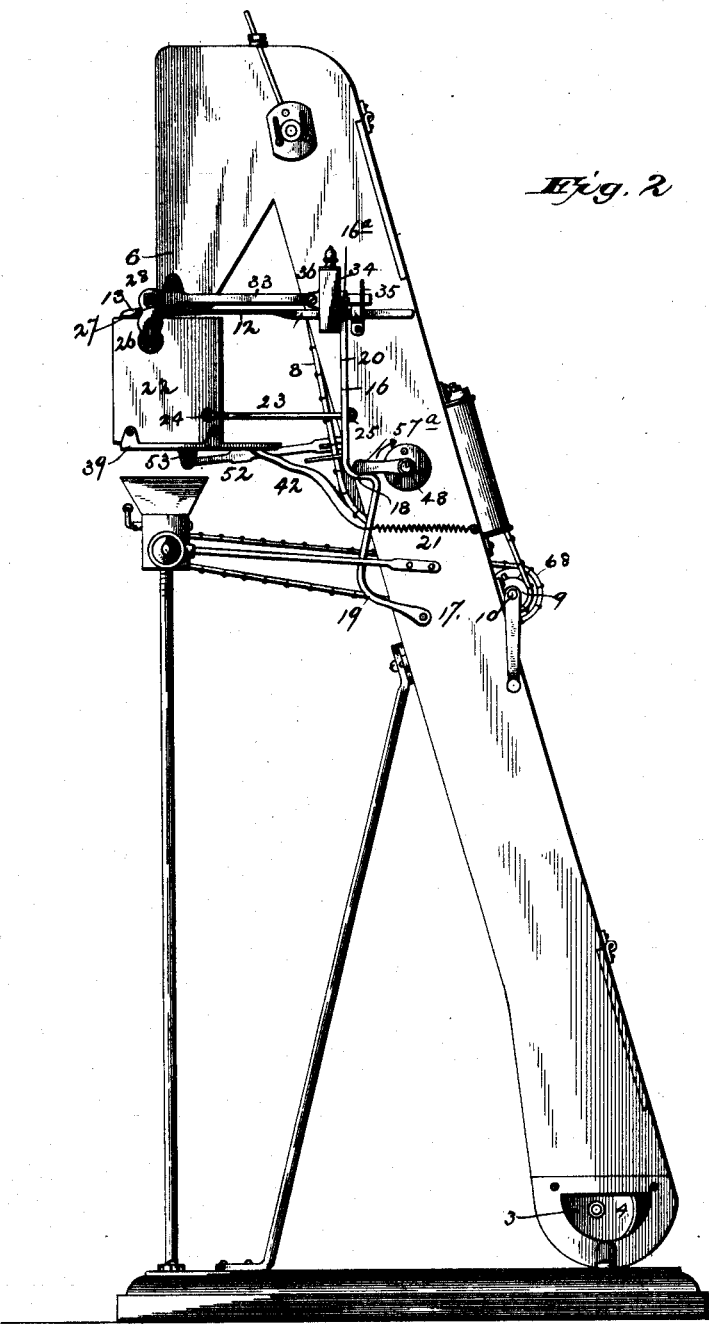

(Model.) 3 Sheets—Sheet 3.
W. LOONEY.
GRAIN MEASURING OR WEIGHING APPARATUS.
No. 431,948. Patented July 8, 1890.
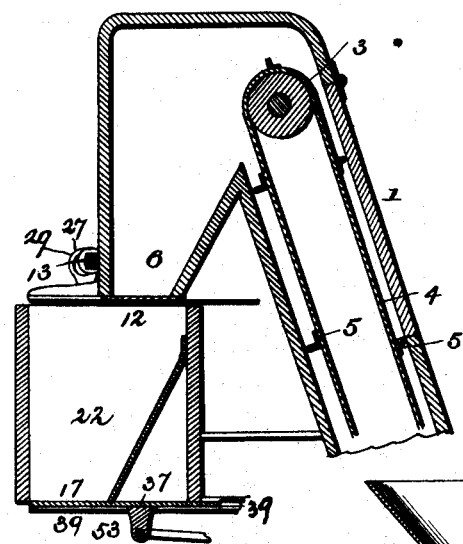
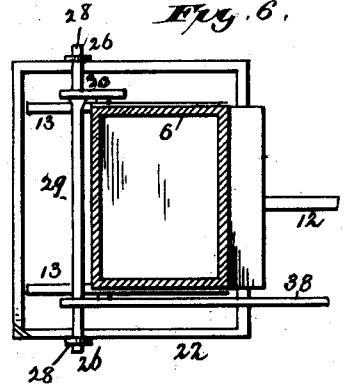
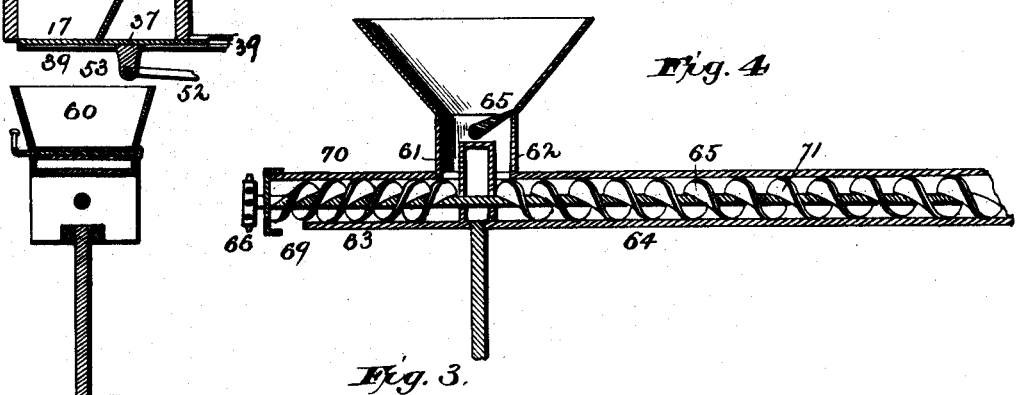
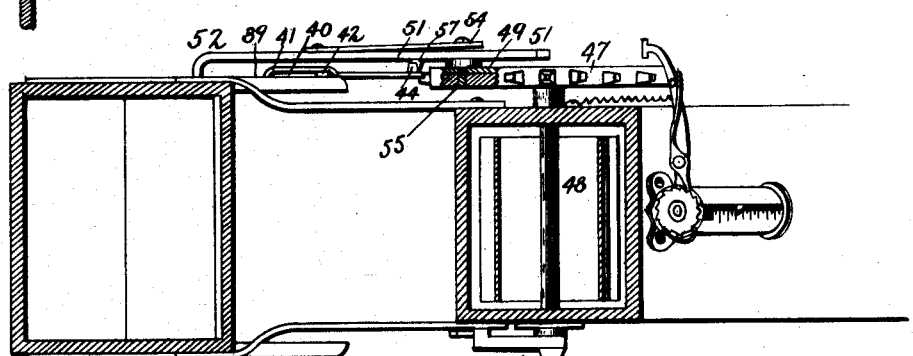
WITNESSES:
INVENTOR:

UNITED STATES PATENT OFFICE.

WILLIAM LOONEY, OF OXFORD, INDIANA, ASSIGNOR OF ONE-HALF TO JAMES PICKERING, OF SAME PLACE.

GRAIN MEASURING OR WEIGHING APPARATUS.

SPECIFICATION forming part of Letters Patent No. 431,948, dated July 8, 1890.

Application filed February 25, 1890. Serial No. 341,673. (Model.)

*To all whom it may concern:*

Be it known that I, WILLIAM LOONEY, a citizen of the United States, and a resident of Oxford, in the county of Benton and State of Indiana, have invented certain new and useful Improvements in Grain Measuring or Weighing Apparatus; and I do hereby declare that the following is a full, clear, and exact description of the invention, which will enable others skilled in the art to which it appertains to make and use the same.

My invention relates to improvements in grain measuring or weighing apparatus, and is designed principally for use in connection with thrashing-machines, whereby the grain as it issues from said machines is elevated to a delivery chute or spout, from whence it is delivered to a weighing-bucket, which automatically weighs the same and registers the amount thereof, the grain being then discharged into a hopper connected with a double or two-part spout, which delivers it upon either or both sides of the machine into a wagon or other receptacle.

The object of my invention is to provide a grain-weighing apparatus which shall be simple in construction, economical in manufacture, durable in use, and efficient and reliable in operation, whereby the grain is rapidly and accurately weighed and measured, and the amount thereof passing through the apparatus registerered by a suitable device.

The invention consists, essentially, in a weighing-bucket pivoted to the elevator-casing and pivotally connected with the delivery-spout and with a pivoted scale-beam having an adjustable weight thereon, so that when the proper amount of grain—say one bushel—has been admitted to the bucket it will overcome the gravity of the weight and be depressed, causing a wheel fast on a shaft journaled in the elevator-casing to be thrown into gear with a continuously-revolving wheel loose on said shaft and an arm operatively connected to a reciprocating slide in the bottom of the bucket to allow the contents of said bucket to be discharged. Said fast or fixed wheel rotates its shaft, which is provided at its other end with a crank-arm, which actuates a pivoted lever connected with the slide in the delivery-spout, by which the latter is closed and the supply of grain cut off. Underneath the weighing-bucket is a hopper having a double outlet and a pivoted flat valve, which can be so adjusted as to cause the grain fed to said hopper to be directed into either or both of the sections of a two-part delivery-spout having a shaft centrally located therein, provided with oppositely-arranged spirals in each section, whereby the grain is carried to either or both sides of the thrashing-machine and delivered to wagons or other similar vehicles or receptacles, as will hereinafter more fully appear.

The invention thus briefly outlined in the above description will now be fully described with reference to the accompanying drawings, in which—

Figure 1 is a side elevation of an apparatus constructed according to my invention. Fig. 2 is a similar view of the same looking from the opposite side. Fig. 3 is a horizontal section on the line $x\,x$, Fig. 1. Fig. 4 is a vertical section on the line $y\,y$, Fig. 1. Fig. 5 is a sectional view of the measuring-bucket and delivery-hopper. Fig. 6 is a detail section on line $z\,z$, Fig. 1; and Fig. 7 is a detail view of the perforated wheel.

In the said drawings, in which similar reference-numerals indicate similar parts in all the figures, the numeral 1 designates a conveyer or elevator shaft, the lower end of which rests upon a base or support 2, adapted to lie in close proximity to the discharge-orifice of a thrashing-machine, so that said orifice and shaft communicate with each other. In the upper and lower ends of this shaft or casing are journaled pulleys 3 3, over which passes an endless band or belt 4, provided with elevating-buckets 5, by which the grain is elevated to the delivery-chute 6, the shaft of the upper pulley being provided with a sprocket-pinion 7, by which it is rotated, and motion imparted to the endless belt by a sprocket-chain 8, passing over another sprocket-pinion 9 on the shaft 10, which is driven by suitable connections from the thrashing-machine. The mouth of the delivery-chute is provided with a slide or cut-off 12, by which the supply of grain to the weighing-bucket located underneath is cut off at the proper time. Plates 13 are secured to the end of the chute 6, having inwardly-turned lower edges forming ways in which the slide 12 travels. Secured to this slide is a rearwardly-projecting arm 14, provided with an eye or loop 16ª, within which fits the upper end of a lever 16, pivoted at 17 to the elevator-casing. This lever is provided with a central bend 18, forming two arms 19 20, which lie in different vertical planes, for a purpose hereinafter to be explained. 21 designates a coiled spring secured to said lever and the elevator-casing, respectively, whereby the lever is restored to its normal position.

The numeral 22 designates the weighing-bucket, which may be of any suitable shape and of any size found desirable or convenient. 23 23 designate stay-rods pivoted to said bucket at 24 and to the elevator-casing at 25. Secured to the bucket at its upper portion are lugs 26, having enlarged eyes 27, which receive the journals 28 of the transverse shaft 29. Projecting rearwardly from this shaft are lugs 30, in which seat the lugs 32, secured to plates 13. One of the lugs 30 is extended rearwardly or connected with or formed into a scale-beam 33, having a sliding adjustable weight 34, which regulates the amount of grain necessary to depress the bucket, said beam being provided with the usual scale or indicating marks. The free end of the scale-beam works in a guide 35, secured to the elevator-casing. The weight 34 must be of such a character and so proportioned that when set at a particular mark—say one bushel on the scale-beam—it will require the weight of grain in the bucket to equal one bushel in order to depress the bucket, as is usual in such classes of weighing apparatus. The weight is grooved to embrace and slide upon the scale-beam, and is held in proper position by means of a set-screw 36.

The numeral 37 designates a reciprocating slide forming the bottom of the weighing-bucket, and is actuated by the means hereinafter described to open the same and discharge the contents. This slide works in ways formed by the inwardly-turned edges 38 of the plates 39, secured to said bucket. One of these plates is provided with a rearwardly-extending arm provided with a longitudinal slot 40, within which works the upwardly-projecting end 41 of the bent lever 42, pivoted to the elevator-casing at 43. At the bend of this lever is an outwardly-projecting lug 44, for a purpose hereinafter explained. Said lever is pivoted to the elevator-casing, and is returned to its normal position by means of coiled spring 46, secured thereto and to the elevator-casing.

Intermediate of the sprocket-pinions 7 and 9 is a sprocket-wheel 47, loosely mounted on the shaft 48, journaled in the elevator-casing, the sprockets of this wheel meshing or engaging with the chain 8. The outer face of this sprocket-wheel is recessed or cut away, so as to receive a crank-wheel 49, fast on the shaft 48. This wheel 49 is provided with a crank-pin 50, upon which is fulcrumed a lever 51, the long arm 52 of which is extended forwardly and then transversely and pivotally connected with a depending lug 53, secured to the under side of the slide 37. Secured to the arm 52 is a spring-arm 54, carrying at its rear end a pin 55, which fits and works in a central aperture in the crank-pin 50. The wheel 47 is provided with a series of perforations 56, corresponding in size with the pin 55, and so arranged as to register with the said aperture in the crank-pin.

Intermediate of its ends the arm 54 is provided with an inwardly-projecting beveled lug 57, engaging with the lug 44 of the lever 42, whereby the arm 54 is pressed outward and the pin 55 disengaged from the perforations in the sprocket-wheel, and the latter and the crank-wheel thus thrown out of mesh with each other. Upon the opposite end of the shaft 48 is a crank-arm 57ª, which, when the shaft is rotated, strikes against the lower arm 20 of the lever 16, moving it forward, actuating the arm 14, and opening the mouth of the chute and allowing the grain to be supplied to the weighing-bucket. The short arm of lever 51 is provided with an upwardly-projecting curved arm 58, which in the rotation of the crank-wheel strikes the end of a lever 59, pivoted to the shaft of a registering device. This registering device may be of any ordinary or suitable construction, and is secured to the elevator-casing at any convenient point. The lever 59 is provided with a pawl engaging with a ratchet on the shaft of the registering device, so that as said lever is actuated by the arm 58 the said shaft is rotated, thereby moving a pointer by which the number of times the bucket has been operated will be indicated, thus enabling the aggregate weight of the grain to be ascertained.

Located beneath the measuring-bucket is a hopper 60, the bottom of which is divided into two chambers 61 and 62, which communicate, respectively, with a two-part delivery-tube consisting of two cylindrical sections 63 and 64.

The numeral 65 designates a flap-valve, located centrally in the hopper just above the chambers 61 and 62, and by shifting it from one side to the other or holding it vertically the grain may be directed into either or both of said chambers and from thence to the sections 63 and 64. One of the sections 64 is open at its free end and is of a length sufficient to extend across a thrashing-machine, so that a wagon or other receptacle may be filled on the side of the machine opposite to the elevator. The other section 63 is much shorter than section 64, and both these sections at their inner ends are secured to and communicate with the chambers 61 and 62.

Located centrally within the sections 63 and 64 and journaled in the walls of chambers 61 and 62 and the closed end of section 63 is a shaft 65, one end of which projects beyond the end of section 63, where it is provided with a sprocket-pinion 66, connecting by means of the sprocket-chain 67 with the pinion 68 on the shaft 10, by which motion may be imparted to said shaft 65. The section 63 is provided with a delivery-opening 69 near its outer end.

Secured to the shaft 65 are the two spirals 70 and 71, which are coextensive with and located respectively in sections 63 and 64. These spirals serve to force the grain from the chambers 61 and 62 to the delivery ends of the spout, they being arranged oppositely to each other—that is to say, they are wound upon the shaft in opposite directions, so that the grain is conveyed thereby from the inner end of each section to the outer end. The brace-rods 72 and 73 support the delivery-spout and elevator, being secured thereto and to the base of the machine; but it is obvious that these rods and the base may be dispensed with and the apparatus supported in any other manner desired. Horizontal brace-rods 74 may also be employed.

The operation of the apparatus is as follows: The normal position of the parts being with the bottom of the measuring-vessel closed and the throat of the discharge or supply chute open, the elevator is brought into close proximity with the thrashing-machine, with the lower end communicating with the discharge-opening from said machine and the shaft 48 connecting with some part of the machine, so as to be rotated as the machine works. The weight on the scale-beam is adjusted so as to register thereon with the number of pounds which it is desired that the bucket shall discharge. As the thrashing-machine works, motion will be transmitted from shaft 48 to pinions 7 and 9, and also to the intermediate sprocket-wheel. The latter being loose on its shaft will freely revolve thereon. The grain as it emerges from the thrashing-machine is carried by the conveyer-belt to the supply-chute, from whence it is discharged through the open throat to the weighing-bucket underneath. It will be noted that the sprocket-wheel on the shaft 48 revolves continually, and as it is loose on said shaft the latter is not rotated as long as said wheel is not in mesh or connected with the crank-wheel fast on said shaft, the pin 55 being held out of engagement with the perforations 56 by reason of the lug 44 of lever 42 engaging with lug 57 on the arm 54, forcing the latter outwardly, as seen more clearly in Fig. 3. In this position of the parts the crank-arm 57 on the opposite end of shaft 48 engages with the lower arm of lever, pressing it forward and opening the mouth of the supply-chute. When a sufficient quantity of grain has been supplied to the weighing-bucket to overbalance the weight on the scale-beam, the bucket will begin to descend, causing the upper end of the bent lever 42 to be moved forward, disengaging lugs 44 and 57 and allowing the spring-arm 54 by its resiliency to press inwardly, forcing the pin 55 into one of the perforations 56 in the rapidly-revolving sprocket-wheel. This will connect or throw into mesh the sprocket and crank wheels, causing the latter to be revolved with its shaft 48. As the crank-wheel revolves, it carries the crank-pin 50 with it, which causes the arm 52, connected with the sliding bottom of the weighing-bucket, to be drawn backward and the contents of said bucket discharged. The sliding bottom of the weighing-bucket will be open to its greatest extent as the crank has completed one-half of its stroke, and as said crank continues its movement the bottom will commence to close until just at the moment the crank is completing its stroke. The bottom will be completely closed, and as the bucket has been elevated by the weight on the scale-beam the bent lever 42 will be drawn backward by its spring, and its lug 44 coming into engagement with the lug 57 on the arm 54 the latter will be forced outward, withdrawing the pin 55 from the perforation in the sprocket-wheel, and the crank-wheel and its connected parts will remain stationary until the bucket again descends and throws the pin into one of the perforations in the sprocket-wheel, when the operation will be repeated. Just as the crank-wheel commences to rotate, as stated above, the crank-arm 57ᵃ on the opposite end of shaft 48 is actuated, causing it to be thrown out of engagement with the arm 20 of the lever 16, causing the latter to be drawn backward by its coiled spring, actuating arm 14 and operating the slide or cut-off 12 to close the mouth of the delivery or supply chute 6. As the crank-arm continues its movement, it will again open the mouth of the chute as the bottom of the weighing-bucket closes. It will be seen that at each discharge of the weighing-bucket and consequent rotation of the crank-wheel the curved arm 58 of lever 51 will come in contact with and actuate the lever 59, which, by means of its pawl and a ratchet on the shaft of a registering device, will cause the amount of grain discharged from the weighing-bucket to be registered. This registering device may be of any of the ordinary or well-known constructions. As the grain is discharged from the weighing-bucket, it falls into the hopper 60, where, by means of the flap-valve 65, it may be directed to either or both of the chambers 61 and 62, and from thence to the sections 63 and 64. From these sections the grain is discharged into wagons or other receptacles, the spirals 70 and 71 forcing the grain from the chambers outwardly by reason of their being oppositely arranged on the shaft 65. This shaft is revolved by means of the sprocket-chains 67 and pinions 66 and 68. It will thus be seen that grain can be delivered from the spout upon either side of the thrashing-machine, as may be desired, or upon both sides simultaneously.

Having thus described my invention, what I claim is—

1. In a grain-weighing apparatus, the combination of a pivoted weighing-bucket having a scale-beam and an adjustable weight and provided with a sliding bottom, a rotary shaft carrying a loose wheel having perforations and a fast wheel having a crank-pin, an arm connecting said crank-pin and the sliding bottom of the weighing-bucket, a spring-arm secured to said connecting-arm, a pin on the spring-arm passing through the crank-pin and crank-wheel and adapted to engage with the perforations in the loose wheel, a lug on the spring-arm, a pivoted bent lever having a lug engaging with the lug on the spring-arm and provided with an upwardly-projecting end, and a plate on the weighing-bucket, having a slot in which said end works, substantially as described.

2. In a grain-weighing apparatus, the combination of a pivoted weighing-bucket having a scale-beam and an adjustable weight and provided with a sliding bottom, a rotating shaft carrying a loose sprocket-wheel having perforations and a fast wheel having a crank-pin, an arm connecting said crank-pin and the sliding bottom of the weighing-bucket, a spring-arm connected with said connecting-arm, a pin on the spring-arm passing through the crank-pin and crank-wheel and adapted to engage with the perforations in the loose sprocket-wheel, a lug on the spring-arm, a pivoted bent lever having a lug engaging with the lug on the spring-arm and provided with an upwardly-projecting end, and a plate on the weighing-bucket having a slot in which said end works, and sprocket-pinions, and a sprocket-chain connecting said pinions and the loose sprocket-wheel, substantially as described.

3. In a grain-weighing apparatus, the combination of a pivoted grain-bucket, a shaft carrying a sprocket-wheel and a fast crank-wheel having a crank-pin, an arm or lever pivoted on said crank and connected with the sliding bottom of the weighing-bucket, and a registering device having a lever engaging with one of the arms of said pivoted lever, substantially as described.

4. In a grain-weighing apparatus, the combination, with a delivery-chute provided with a sliding cut-off and a pivoted weighing-bucket having a sliding bottom and a scale-beam and an adjustable weight, of a rotatable shaft having a loose wheel provided with perforations and a fast wheel having a crank-pin, an arm connecting said crank-pin and the sliding bottom of the weighing-bucket, a spring-arm secured to said connecting-arm, a pin on the spring-arm passing through the crank-pin and crank-wheel, a lug on the spring-arm, a pivoted lever having a lug engaging with the lug on the spring-arm, a crank on the end of the shaft carrying the loose and fast wheels, a bent lever engaging with said crank, and connections between said lever and the sliding cut-off in the chute, substantially as described.

In testimony that I claim the foregoing as my own I have hereunto affixed my signature in presence of two witnesses.

WILLIAM LOONEY.

Witnesses:
CHARLES DAILEY,
W. R. PHARES.